Feb. 20, 1940.  R. W. JOHNSON  2,191,278
VEHICLE LAMP
Filed Dec. 13, 1937
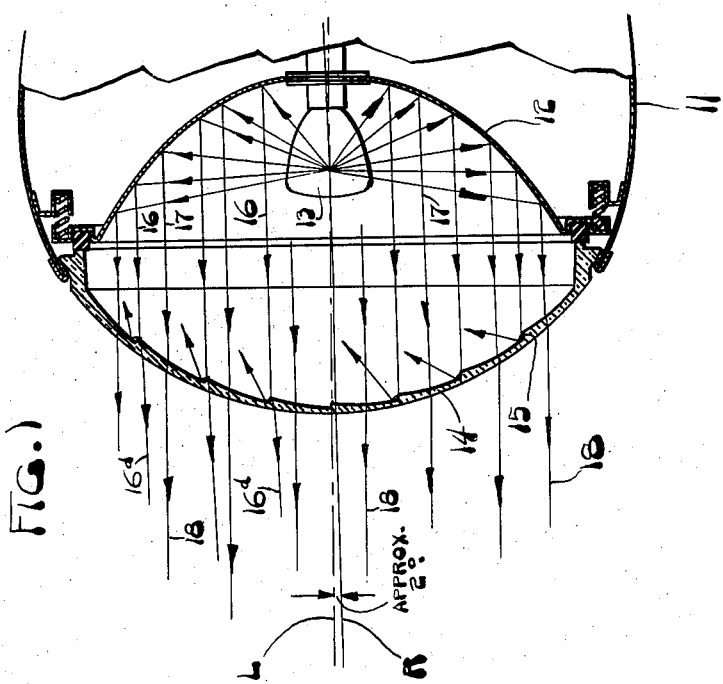
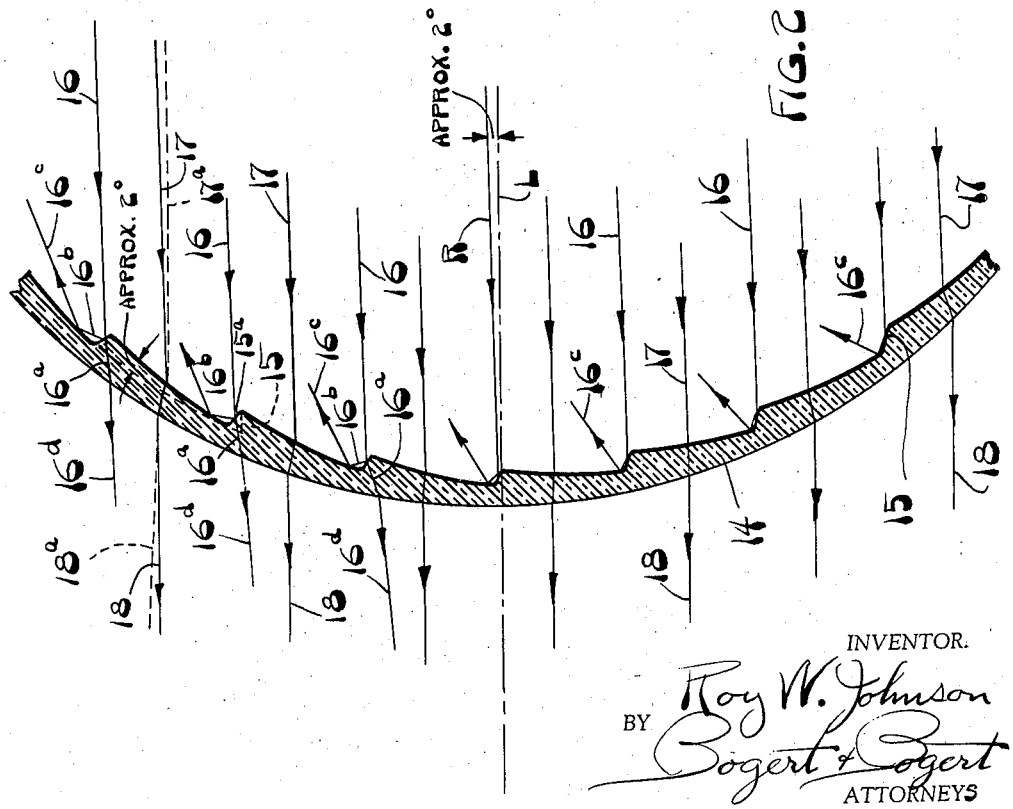
INVENTOR.
Roy W. Johnson
BY
Bogert & Bogert
ATTORNEYS Patented Feb. 20, 1940

2,191,278

UNITED STATES PATENT OFFICE 2,191,278

VEHICLE LAMP

Roy W. Johnson, Wyoming, Ohio

Application December 13, 1937, Serial No. 179,440

1 Claim. (Cl. 240—41.3)

The invention herein described is one especially designed with a primary object of producing a vehicle lamp which is a material factor in contributing to the safety of illumination from automobile lamps.

A further object is that of producing a vehicle lamp which will create a light beam pattern of required general shape and light intensity distribution without causing a condition of danger as to light reflections and refractions from surfaces and portions of the lamp lens which have to exist because of structural necessity and manufacturing expediency.

A further object is to produce a vehicle lamp, the lens of which will effect a material saving in the quantity of glass usually required for a lens of the type employed for automobile head lamps, thereby reducing the weight of such a lens and also decreasing its cost, as well as avoiding thereby light losses which ordinarily occur through absorption through the thicker prismatic formations of the usual lens, in this manner enabling me to produce a lens of materially increased efficiency and consequent light projection qualities.

An additional object is to produce a lamp in which the propagation of the light beam therefrom is accomplished in a unique manner through structural changes and cooperating lamp part placement, to develop a beam of increased power, efficiency and safety both as to the driver of the vehicle which is equipped with my improved lamp, as well as the driver of a vehicle approaching from an opposite direction.

Those and other objects are attained in the vehicle lamp described in the following specification and illustrated in the accompanying drawing, in which:

Fig. 1 is a fragmental sectional elevational view of a lamp of the novel type set forth herein, and showing by arrow-marked lines the path of representative rays of light within and from the lamp.

Fig. 2 is a somewhat enlarged fragmental section of a lens of the improved type of lamp shown in Fig. 1, disclosing diagrammatically the light refractions and reflections which occur relatively to the lens surface constituting important elements of the invention.

In my improved lamp I contemplate employing the general type disclosed in Fig. 1, in which the body 11 may be of conventional design, with a reflector 12 mounted therein, a lamp bulb 13 supplying the light, and lens 14 closing the reflector. The reflector 12 preferably is of parabolic form in order that its parallelizing effects on the light rays may be utilized. The lens preferably, although not necessarily, may be of convex form in order that it may blend with the generally prevailing form of body design being employed at this time.

Lenses for such lamps heretofore have constituted prismatic surfaces in which the angularity of the surfaces, essentially divergingly downwardly, create certain undesirable optical characteristics. Such characteristics are observable both through their photometric and ocular detection. The presence of these characteristics constitutes one of the principal factors which have given lamp designers much trouble to overcome the glare and consequent danger as well as legal difficulty in complying with the laws and regulations set up by the cities or states for the purpose of controlling such matters. The direct cause of the difficulties just mentioned is found in the step-like surfaces of the short sides or fillers of the prisms of the lens.

Since it is desirable to have prismed areas of the lens confined to the back surfaces thereof, so that the front face presents a relatively smooth surface in order that it may be kept as clean as possible, the prisms are found on the rear face. This then gives rise to a problem in manufacture which is overcome only in one way. Because such a lens is made by pressing a quantity of molten glass within a concave mold so that it has a relatively smooth convex face such as presented in the lens shown, the plunger which is employed for this purpose is formed with the necessary formations which will create the prismed concave surface of the lens. Since the prisms are distinguished from each other by offsets or steps 15, it would be impossible to form such steps with surfaces undercut or even aligned with the movement of the plunger because of sticking and other tendencies relatively to the plunger and its associated glass blank which take place particularly along lines of such acute and parallel angular relationship as are presented by the prism steps. Such difficulties are overcome to some extent by forming the steps with fillers 15a at an angle to the direction of movement of the lens-forming plunger. Thus ready separation of the plunger and glass surfaces takes place without sticking, deformation, destruction or roughing such step surfaces so as to lead to rendering the completed lens unuseable.

Now, in order that the reader of this specification may the better understand a distinction which my invention has made over the usual lamp and lens structure, as well as to understand the advantages obtained thereby, it is pointed out that a lens having the prisms thereof arranged in downwardly diverging face formation, is common practice. In such a lens, employing the acutely angular relationship of the filler surfaces relatively to the direction of pressing, and withdrawal movements of the forming plunger of the mold, as has been described, an element of very grave danger, optically speaking, has been introduced. Merely for purposes of understanding the action of such filler surfaces in an ordinary lens, the reader is requested for the moment to turn the drawing upside down. It will be noted that the paths of the light rays 16d as they emerge from the convex side of the lens, after they have been acted upon by the filler surfaces 15a, are in an upward direction. Thus, this upwardly projected light creates a condition of glare which at once gives rise to a problem as to how to dispose of the difficulty, because such a critical situation not only makes the lens dangerous, but also causes the more stringent lighting enforcement regulations to refuse to sanction the use of such lenses within territories so protected, much to the annoyance, expense and consequent loss of both the user and producer of such lighting equipment.

By now referring to the drawing in rightside up position, the reader will observe that the objection to glare as produced in the usual lens construction which I have thus described above, has been overcome. For example, the filler surfaces will be seen to have inclination toward the direction from which the light is coming to enter the lens. These surfaces therefore will cause both refracted and reflected rays produced therefrom to take the paths of travel indicated respectively by 16a and 16b with relation to rays 16. Certain reflected rays as 16b will result in rereflections 16c as shown, but such rereflections actually have little or no effect because of their relative weakness and also because they do not enter the lens at all.

I have aimed in the foregoing disclosure to show how I overcome the objectionable glare from the zones produced by the filler surfaces between the prisms of the usual lens and I have shown how simply the radical change from imperfection to perfection can be obtained, but, there are other advantages which this change also has accomplished. One of these advantages is to be found in the fact that the downwardly diverted light from the lens fillers may be employed very useably by allowing it to illuminate the roadway immediately in front of the car, whereas in previous structures such light has been unused and as well has constituted a source of great danger through its upwardly and wide spread zones of glaring light. Still another feature of advantage both optically and as an item of cost saving as well as weight saving, is found in the simple manner in which the zones produced by the filler surfaces of the lens may be reduced in width by dividing wide prism zones into two or more prismatic formations for each zone at present used, thereby enabling me in my present construction to reduce the width of each of these zones and in this manner causing a several fold accomplishment of function. First, by increasing the number of said zones, thereby decreasing their width, as has been stated, the lighting of the roadway immediately in front of the car is made much more uniform and less blotchy or patchy. Second, by breaking up the prismed formations into two or more for each usual prism width, the lens is thereby made less bulky because I am enabled to make it of a much less thickness than heretofore, thereby causing it to function with a greater degree of efficiency because of its having less light absorption than through a thick lens. Third, by being enabled to reduce the lens thickness in this manner, much glass is saved, thereby enabling me to effect a material saving in the cost of such a lens as compared with others of the usual type. Additionally, I may mention a fourth advantage which this saving in glass effects. I refer to the decrease in weight of my lens as compared with one of the usual heavy glass type. All these features of novelty are attained in my improved lens without having to resort to such artifices as the well known subterfuges of actual coating or painting of the filler surfaces in order to avoid glare therefrom, or of having to resort to some such equally obvious and well known methods of glare reduction as by fluting, stippling, roughening or otherwise spreading or diffusing the light projected from such glaring filler surfaces.

Since, because of the particular construction of the lens I have just described, in which the prisms are approximately of from one to two and a half degree divergence or spread, it is obvious that horizontal and parallel rays of light 17a from the lamp reflector 12 would be projected through the lens prisms and thereby direct light therefrom in an upward direction 18a of approximately one to two and a half degrees from the lamp, in this manner defeating the good results obtained from the elimination of glare from the lens fillers 15a, as has been described. Therefore, I incorporate in my improved lamp the simple expedient of mounting the reflector so that its axis R occupies an acute angle of approximately two degrees, thereby directing the light rays both forward and downward with relation to the horizontal lamp axis L, such that the substantially parallel rays 17 from the reflector will strike the prismed inner surface of the lens and become refracted so as to pass therefrom as substantially horizontal rays 18 of a projected light beam from the lamp. In this manner the lamp and its lens may occupy a horizontal axial position and the beam projected therefrom also will be substantially horizontal, axially of the lamp.

This constitutes a continuation in part of application Serial Number 81,715, covering a Lens for vehicle lamps, which I filed under date of May 25, 1936.

Having thus described my invention what I claim is:

In combination with a vehicle, a lamp comprising a body, a parabolic reflector within the body, a source of light substantially at the focus of the reflector, and a closure lens for the body, said lens containing inverted prisms on its inner face, whereby the base of each is uppermost and occupies substantially horizontal placement, and fillers between the adjacent inner faces of the prisms, the surfaces of said fillers being substantially straight in transverse cross section and inclined to receive light from the reflector, the reflector axis occupying an angle to the prism faces such that light projected through the prisms will be directed substantially nonparallel with the reflector axis, said filler surfaces transmitting light from the reflector and substantially crossing that transmitted by the prisms, and means mounting the lamp on the vehicle whereby when the prism-projected light lies substantially parallel with the vehicle axis, the filler-projected light will be directed substantially toward the surface of the road over which the vehicle is traveling.

ROY W. JOHNSON.